United States Patent
Yang

(10) Patent No.: US 8,874,142 B2
(45) Date of Patent: Oct. 28, 2014

(54) METHOD OF INFORMING OF SUPPORT OF ZONE-BASED SERVICE AND RELATED COMMUNICATION DEVICE

(75) Inventor: Ju-Ting Yang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 81 days.

(21) Appl. No.: 13/249,247

(22) Filed: Sep. 30, 2011

(65) Prior Publication Data

US 2012/0108267 A1 May 3, 2012

Related U.S. Application Data

(60) Provisional application No. 61/407,458, filed on Oct. 28, 2010.

(30) Foreign Application Priority Data

Mar. 31, 2011 (TW) .............................. 100111376 A

(51) Int. Cl.
*H04W 24/00* (2009.01)
*H04W 4/20* (2009.01)

(52) U.S. Cl.
CPC .................................. *H04W 4/203* (2013.01)
USPC ..................... 455/456.3; 455/422.1; 370/338; 713/168

(58) Field of Classification Search
CPC ..... H04W 24/00; H04W 4/203; H04W 76/00; H04W 88/16
USPC ......................... 455/403, 414.1, 422.1, 432.1, 455/41.1–41.3, 517, 41.2, 39, 435.1, 423, 455/434, 456.3; 370/401, 229, 230, 231, 370/259, 338, 328; 709/227–230, 224; 713/168
See application file for complete search history.

(56) References Cited

U.S. PATENT DOCUMENTS

| | | | | |
|---|---|---|---|---|
| 8,005,073 | B2 * | 8/2011 | Kiss et al. | 370/352 |
| 2005/0228847 | A1 * | 10/2005 | Hayes | 709/200 |
| 2007/0032249 | A1 * | 2/2007 | Krishnamurthi et al. | 455/456.1 |
| 2010/0284390 | A1 * | 11/2010 | Lee et al. | 370/338 |
| 2011/0090886 | A1 * | 4/2011 | Park et al. | 370/338 |
| 2011/0099497 | A1 * | 4/2011 | Fok et al. | 715/769 |
| 2012/0124653 | A1 * | 5/2012 | Alnas et al. | 726/6 |

FOREIGN PATENT DOCUMENTS

| | | |
|---|---|---|
| CN | 101299859 A | 11/2008 |
| CN | 101692656 A | 4/2010 |
| WO | WO 2010050643 A1 * | 5/2010 |

OTHER PUBLICATIONS

OMA Converged Personal Network Service V1.0—Status: Candidate—Release Date: Nov. 17, 2009.*
Converged Personal Network Service Requirements Candidate Version 1.0—Nov. 17, 2009.*
OMA-TS-CPNS_Core-V1_0-20100910-D, "Zone Based Service Support in CPNS Entity Discovery Procedure", Oct. 8, 2010.
OMA-TS-CPNS_Core-V1_0-20110118-D, "Converged Personal Network Service Core Technical Specification", Jan. 18, 2011.
OMA-RS-CPNA-V1_0-20091117-C, "Converged Personal Network Service Requirements", Nov. 17, 2009.
OMA-TS-CPNS_Core-V1_0-20101025-D, "Converged Personal Network Service Core Technical Specification", Oct. 25, 2010.
Office action mailed on Jun. 18, 2014 for the Taiwan application No. 100111376, filing date Mar. 31, 2011, p. 1-6.

* cited by examiner

*Primary Examiner* — Mahendra Patel
(74) *Attorney, Agent, or Firm* — Winston Hsu; Scott Margo

(57) ABSTRACT

A method of informing of support of a zone-based service for a personal network gateway is disclosed. The method comprises including an indicator in a message, wherein the indicator indicates the personal network gateway supports the zone-based service, and sending the message to a personal network entity in a specific zone.

12 Claims, 3 Drawing Sheets

METHOD OF INFORMING OF SUPPORT OF ZONE-BASED SERVICE AND RELATED COMMUNICATION DEVICE

CROSS REFERENCE TO RELATED APPLICATIONS

This application claims the benefit of U.S. Provisional Application No. 61/407,458 filed on Oct. 28, 2010 and entitled "Indication of Zone-Based Service Support in CPNS Entity Discovery Procedure", contents of which are incorporated herein.

BACKGROUND OF THE INVENTION

1. Field of the Invention

The present invention relates to a method of informing of support of zone-based service and related communication device, and more particularly, to a method of informing of support of zone-based service and related communication device in a personal network gateway.

2. Description of the Prior Art

More and more users connect their electronic devices to small range Personal Network (PN), such as a home network, an in-car network and a body area network. Connection between the PN and other networks expands access ability of electronic devices or a Personal Network Entity (PNE) of the PN and realizes many services, such as using PNE outside of PN to access various services. For example, a personal media player connected to the Bluetooth network can receive video contents from the Internet via a cellular phone connecting to the Wide Area Network (WAN).

Open Mobile Alliance (OMA) is the focal point for the development of mobile service enabler specifications, which supports the creation of interoperable end-to-end mobile services. OMA drives service enabler architectures and open enabler interfaces that are independent of the underlying wireless networks and platforms. OMA creates interoperable mobile data service enablers that work across mobile devices, service providers, networks, geography and telecommunication firms.

Furthermore, in the communication protocol of OMA, Converged Personal Network Services (CPNS) server, Personal Network Gateway and PNE form a basic architecture of the CPNS. The CPNS server is a CPNS enabler entity, which replies requests from a Personal Network Gateway (PNGW) and ensures that appropriate applications are selected and appropriate contents are provided to the PNEs.

The PNGW serves as an intermediary entity between the PNEs and other networks that forwards the requests and the responses between the PNEs and the other networks. Besides, the PNEs are connected to the PNGW and between each other, and are used for rendering the contents received from the PNGW or from each other.

Other than the PNGW, the Zone Personal Network Gateway (Zone PNGW) is used for providing better service efficiency. In the CPNS, zone means the geographic area which is related to signalings of physical carriers, service providers, or users. The basic Zone PNGW periodically searches for a confined zone to find out whether there exists a new PNE just entering from the outer PN. Next, the Zone PNGW broadcasts a message to the new PNE to inform of existence of the PNGW and to provide related services to the new PNE, otherwise, the new PNE must spend more time searching for specific services provided by the Zone PNGW if there is no action of pre-informing of the existence of the Zone PNGW.

SUMMARY OF THE INVENTION

It is therefore an objective of the present invention to provide a method of informing of support of zone-based service and related communication device to reduce a time of searching for a specific service.

A method of informing of support of a zone-based service for a personal network gateway is disclosed. The method comprises including an indicator in a message, wherein the indicator indicates the personal network gateway supports the zone-based service; and sending the message to a personal network entity in a specific zone.

A communication device for informing of support of a zone-based service is disclosed. The communication device comprises a memory unit, for storing a program code corresponding to a processing method; and a processor, coupled to the memory unit for processing the program code in order to operate the processing method, wherein the processing method comprising including an indicator in a message, wherein the indicator indicates the personal network gateway to support the zone-based service; and sending the message to a personal network entity in a specific zone.

A method for activating a zone-based service in a personal network entity is disclosed. The method comprises receiving a message from a personal network gateway; reading an indicator in the message; and initiating a service discovery procedure and requesting to register the zone-based service according to the indicator; wherein the indicator indicates the personal network gateway to support the zone-based service.

A communication device for activating a zone-based service is disclosed. The communication device comprises a memory unit, for storing a program code corresponding to a processing method; and a processor, coupled to the memory unit for processing the program code to operate the processing method, wherein the processing method comprising receiving a message from a personal network gateway; reading an indicator within the message; and initiating a service discovery procedure and requesting to register the zone-based service according to the indicator; wherein the indicator indicates the personal network gateway to support the zone-based service.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
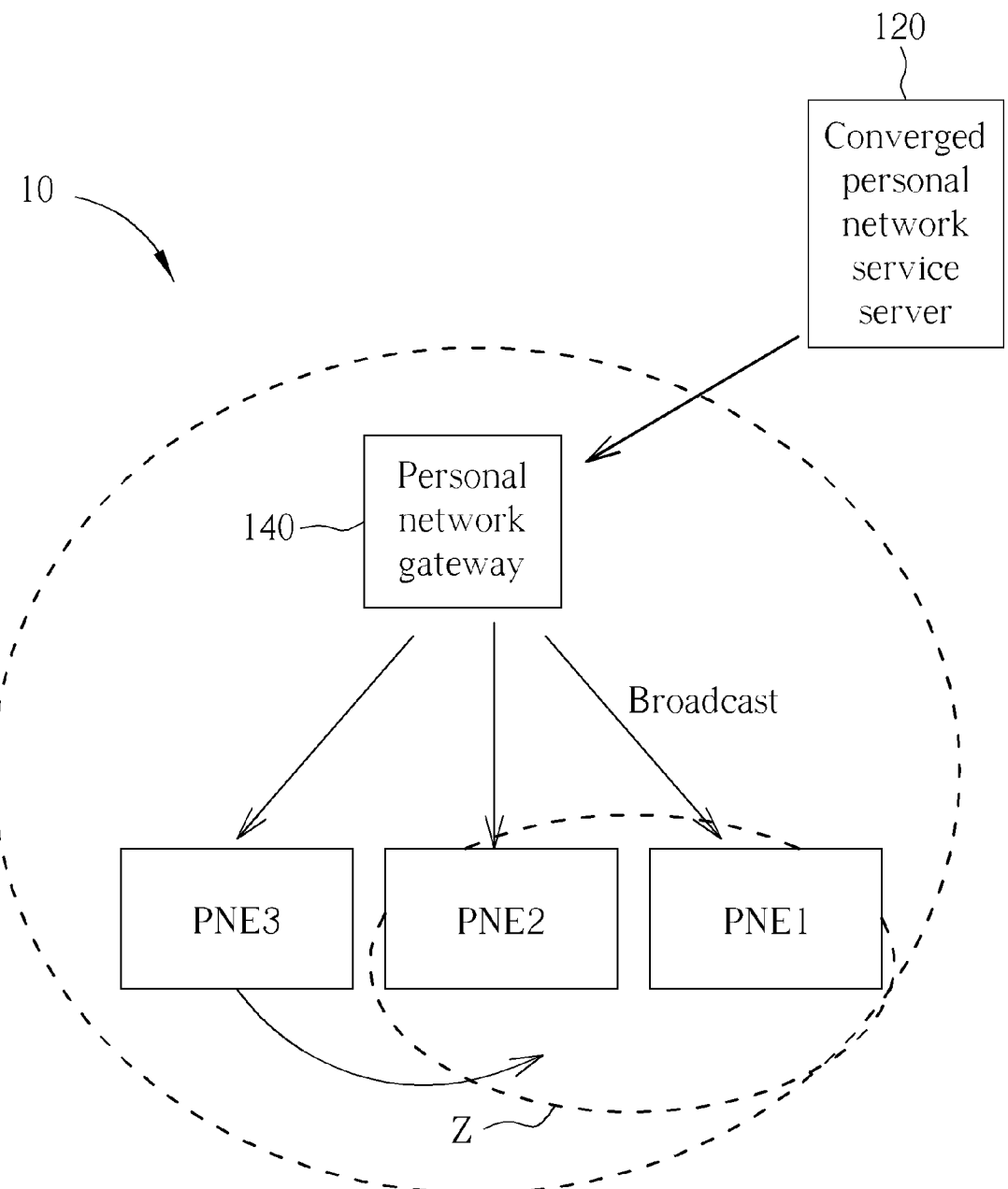
FIG. 1 illustrates a schematic diagram of an exemplary personal network.

Please refer to FIG. 1, which illustrates a schematic diagram of a Personal Network (PN) 10 according to an embodiment of the present invention. The PN 10 includes a Converged Personal Network Service (CPNS) server 120, a Personal Network Gateway (PNGW) 140 and Personal Network Entitys (PNEs) PNE1, PNE2 and PNE3 (For simplicity, there are only 3 PNEs shown in FIG. 1). The CPNS server 120 provides a zone-based service. The PNGW 140 is used to transmit requests and responses between the PNE1, PNE2, PNE3 and the CPNS server 120. The PNGW 140 can be a Zone Personal Network Gateway, informing the PNE1, PNE2 and PNE3 of existence of the PNGW 140 by broadcasting a message, and providing the zone-based service to a new PNE just entering into a specific zone Z. Preferably, the PNGW 140 can be a mobile device or a set-top box. The PNE1 and PNE2 are both in the specific zone Z and the PNE3 just entered from other zones into the specific zone Z. The PNE1, PNE2 and PNE3 can be a mobile device, a personal computer, a music player, a in-car navigation system or a set-top box. In other words, a mobile device can play as the PNE1, PNE2 and PNE3 or the PNGW 140 according to the users' needs and device capabilities.

Figure 2:
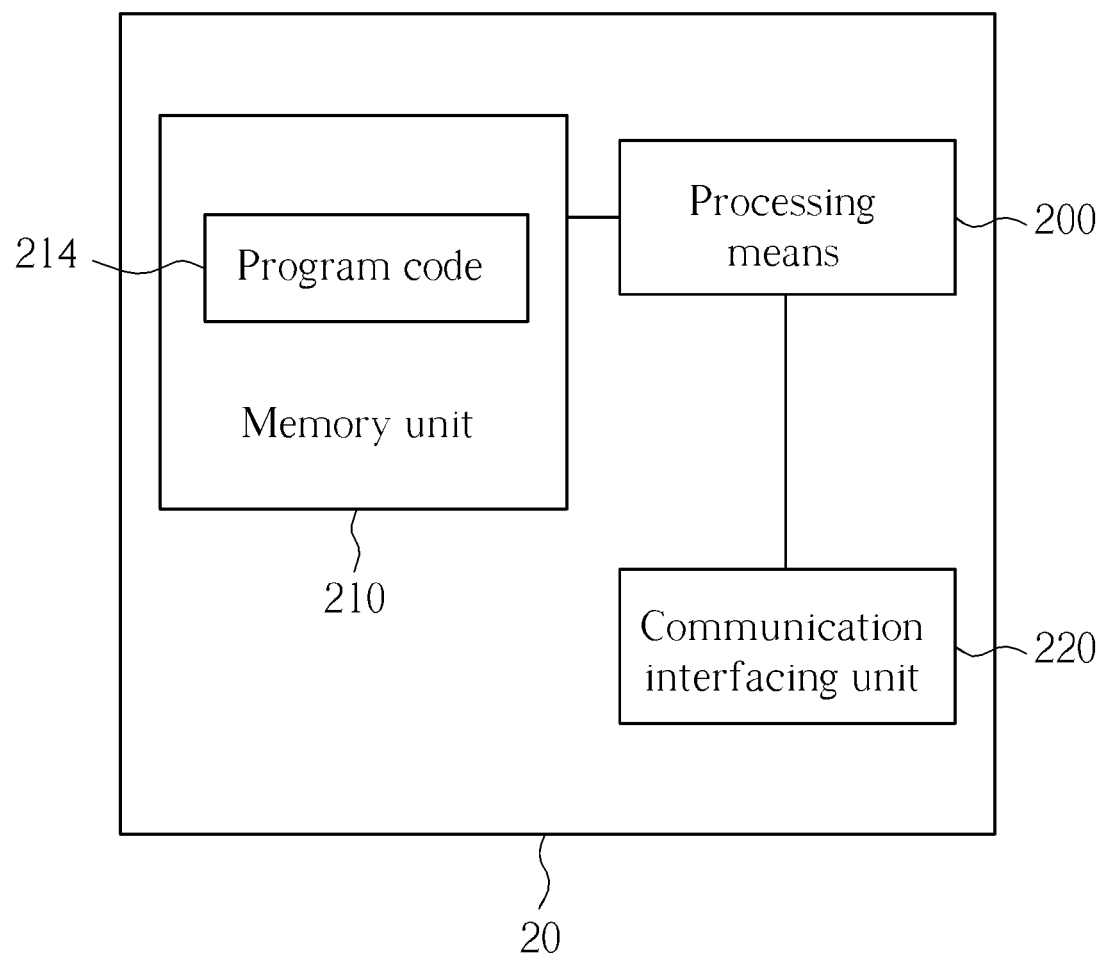
FIG. 2 illustrates a schematic diagram of an exemplary communication device.

Please refer to FIG. 2, which illustrates a schematic diagram of an exemplary communication device 20. The communication device 20 can be the CPNS server 120, the PNGW 140, the PNE1, PNE2 or PNE3. The communication device 20 can include a processing means 200 such as a microprocessor or ASIC, a memory unit 210, and a communication interfacing unit 220. The memory unit 210 may be any data storage device that can store program code 214 for access by the processing means 200. Examples of the memory unit 410 include but are not limited to a subscriber identity module (SIM), read-only memory (ROM), random-access memory (RAM), CD-ROMs, magnetic tapes, and optical data storage devices. According to processing results of the processing means 200, the communication interfacing unit 220 can be a radio transceiver or a wire/logical link for communicating with the corresponding communication devices.

Figure 3:
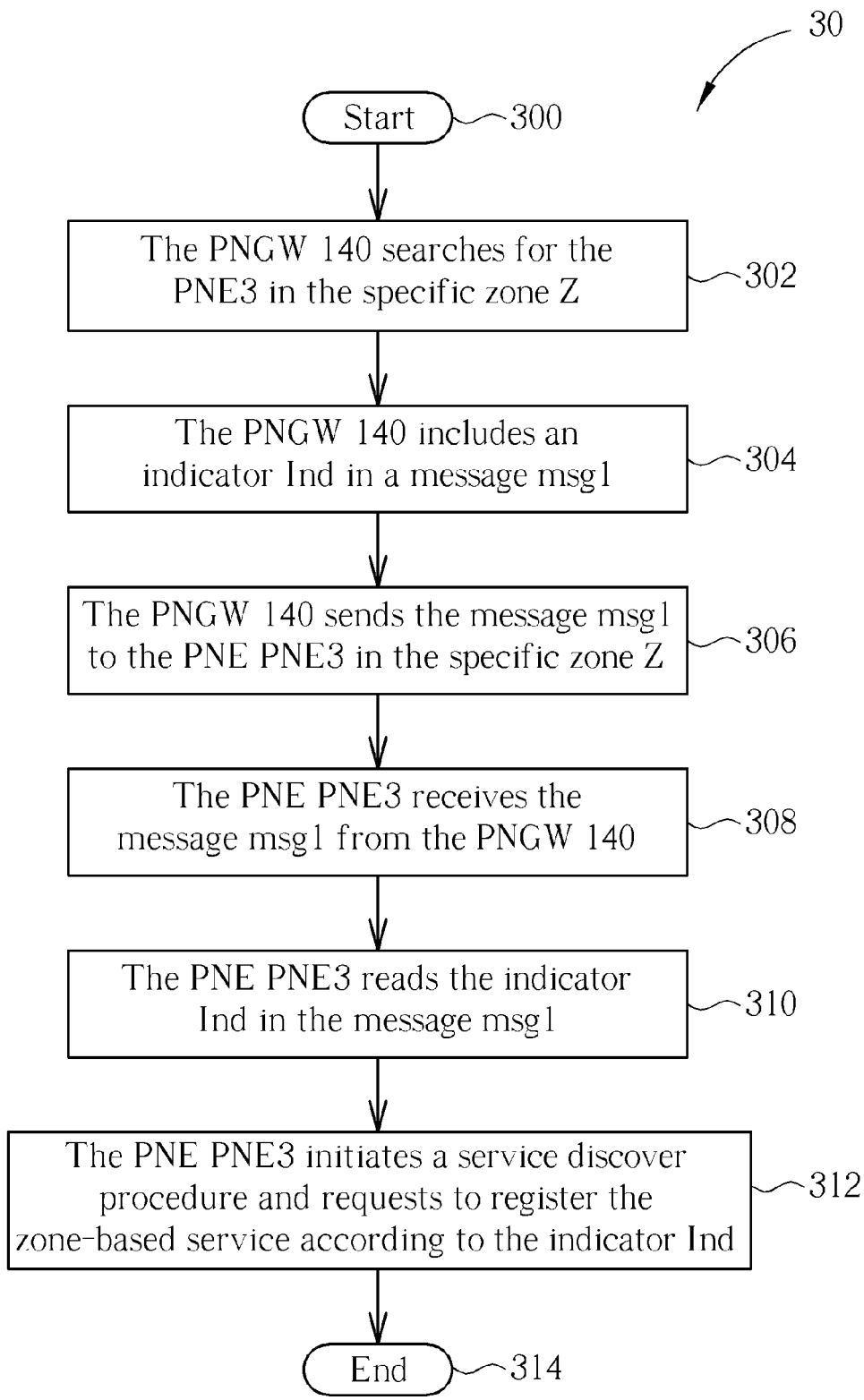
FIG. 3 illustrates a flow chart of an exemplary process.

Please refer to FIG. 3, which illustrates a flow chart of an exemplary process 30. The process 30 can be used in the PN 10 to inform of support of a zone-based service and initiate the zone-based service, which is provided by the PNGW 140. The process 30 can be complied into the program code 214 and includes the following steps:

Step 300: Start.

Step 302: The PNGW 140 searches for the PNE3 in the specific zone Z.

Step 304: The PNGW 140 includes an indicator Ind in a message msg1.

Step 306: The PNGW 140 sends the message msg1 to the PNE PNE3 in the specific zone Z.

Step 308: The PNE PNE3 receives the message msg1 from the PNGW 140.

Step 310: The PNE PNE3 reads the indicator Ind in the message msg1.

Step 312: The PNE PNE3 initiates a service discover procedure and requests to register the zone-based service according to the indicator Ind.

Step 314: End.

According to the process 30, the PNGW 140 searches the specific zone Z and sees if there is a new PN just entering into the specific zone Z. When the PNE3 is entering the specific zone Z from other zones, the PNGW 140 finds the PNE3 and sends the message msg1 including the indicator Ind to the PNE3. When the PNE3 receives the message msg1 from the PNGW 140, the PNE3 reads the indicator Ind in the message msg1, and initiates the service discovery procedure and requests to register the zone-based service. As a result, according to the indicator Ind included in the message msg1, the PNE PNE3 can be informed of support of the zone-based service of the PNGW 140 while entering into the specific zone Z, and immediately requests for related contents of the zone-based service to register to the zone-based service. In comparison with the prior art, the process 30 can inform of the support of the zone-based service of the PNGW 140 earlier to reduce redundant time of searching for the zone-based service.

Preferably, the message msg1 can be an entity discovery request message, an entity discovery response message, a PN action request message, a PN action response message, or a service description advertise message. The entity discovery request message and the entity discovery response message can be transmitted from a PNE to another PNE, from a PNE to a PNGW, from a PNGW to a PNE or from a PNGW to another PNGW. The PN action request message and the PN action response message can be transmitted between the PNE and the PNGW. The Service Description Advertise can be transmitted from a content provider to a CPNS server, from a CPNS server to a PNGW, or from a PNGW to a PNE. The indicator Ind can be included in an information element (IE) of the entity discovery request message or the entity discovery response message. For example, an IE of a zone-based service support, "ZoneBasedServiceSupport", can indicate whether the PNGW 140 supports the zone-based service, and its value can be represented as a Boolean value. Therefore, when the value of the IE of the zone-based service is "true", it means that the PNGW 140 supports the zone-based service. When the value of the IE of the zone-based service is "false", it means that the PNGW 140 does not support the zone-based service.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can inform of support of a zone-based service in the PN 10.

In summary, the zone personal network gateway can transmit the indicator to the PNE just entering into the specific zone by the message including the indicator. When the PNE receives the message, the PNE is informed whether the PNGW supports the zone-based service by the indicator. If the indicator indicates that the PNGW supports the zone-based service, the PNE immediately initiates the service discovery procedure and registers to the service. As a result, the PNE can reduce the time of searching for the zone-based service.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of informing of support of a zone-based service for a personal network gateway thereby reducing search time, the method comprising:

including an indicator in a message, wherein the indicator is an information element and indicates the personal network gateway supports the zone-based service; and actively sending the message to a personal network entity newly entering into a specific zone covered by the personal network gateway, before being requested by the personal network entity to establish a connection, wherein after the message including the indicator is read by the personal network entity, the personal network entity initiates a service discovery procedure in response to the message and requests to register the zone-based service according to the indicator in the message.

2. The method of claim 1, wherein the specific zone is a zone providing the zone-based service.

3. The method of claim 1, wherein the message is an entity discovery request message, an entity discovery response message, a personal network action request message, a personal network action response message, or a service description advertise message.

4. A communication device for informing of support of a zone-based service thereby reducing search time, the communication device comprising:
- a memory unit, for storing a program code corresponding to a processing method; and
- a processor, coupled to the memory unit for processing the program code in order to operate the processing method, wherein the processing method comprising:
  - including an indicator in a message, wherein the indicator is an information element and indicates a personal network gateway to support the zone-based service; and
  - actively sending the message to a personal network entity newly entering into a specific zone covered by the personal network gateway, before being requested by the personal network entity to establish a connection, wherein after the message including the indicator is read by the personal network entity, the personal network entity initiates a service discovery procedure in response to the message and requests to register the zone-based service according to the indicator in the message.

5. The communication device of claim 4, wherein the specific zone is a zone providing the zone-based service.

6. The communication device of claim 4, wherein the message is an entity discovery request message, an entity discovery response message, a personal network action request message, a personal network action response message or a service description advertise message.

7. A method for activating a zone-based service in a personal network entity thereby reducing search time, the method comprising:
- receiving a message from a personal network gateway when the personal network entity newly enters into a specific zone covered by the personal network gateway, wherein the message is actively sent from the personal network gateway before the personal network entity requests the personal network gateway to establish a connection;
- reading an indicator in the message; and
- initiating a service discovery procedure, in response to the received message including the indicator, and requesting to register a zone-based service according to the indicator;
- wherein the indicator is an information element and indicates the personal network gateway to support the zone-based service.

8. The method of claim 7, wherein the personal network entity locates in a specific zone providing the zone-based service.

9. The method of claim 7, wherein the message is an entity discovery request message, an entity discovery response message, a personal network action request message, a personal network action response message, or a service description advertise message.

10. A communication device for activating a zone-based service thereby reducing search time, the communication device comprising:
- a memory unit, for storing a program code corresponding to a processing method; and
- a processor, coupled to the memory unit for processing the program code to operate the processing method, wherein the processing method comprising:
  - receiving a message from a personal network gateway when the personal network entity newly enters into a specific zone covered by the personal network gateway, wherein the message is actively sent from the personal network gateway before the personal network entity requests the personal network gateway to establish a connection;
  - reading an indicator within the message; and
  - initiating a service discovery procedure, in response to the received message including the indicator, and requesting to register a zone-based service according to the indicator;
  - wherein the indicator is an information element and indicates the personal network gateway to support the zone-based service.

11. The communication device of claim 10, wherein the personal network entity locates in a specific zone providing the zone-based service.

12. The communication device of claim 10, wherein the message is an entity discovery request message, an entity discovery response message, a personal network action request message, a personal network action response message, or a service description advertise message.

* * * * *